Aug. 24, 1965

F. C. BROWN ETAL  3,202,825
ARTICLES OF HOT PRESSED ZINC SULPHIDE HAVING A DURABLE
METAL FILM COATED THEREON
Filed Jan. 16, 1963

Frederick C. Brown
Paul B. Mauer
INVENTORS

BY
ATTORNEYS

United States Patent Office 3,202,825
Patented Aug. 24, 1965

3,202,825
ARTICLES OF HOT PRESSED ZINC SULPHIDE HAVING A DURABLE METAL FILM COATED THEREON
Frederick C. Brown and Paul B. Mauer, Rochester, N.Y., assignors to Eastman Kodak Company, Rochester, N.Y., a corporation of New Jersey
Filed Jan. 16, 1963, Ser. No. 251,785
4 Claims. (Cl. 250—216)

This invention relates to coated polycrystalline elements. More particularly, this invention relates to dense hot pressed unitary polycrystalline zinc sulfide elements having coated thereon a sublayer of zinc sulfide and a surface layer of another metal or metallic salt.

Hot pressed, zinc sulfide elements are formed by pressing a zinc sulfide powder in a mold under conditions of high pressure, high temperature and high vacuum, or in an atmosphere of inert gas, to a dense molded unit of polycrystalline zinc sulfide. The resulting element is a solid within the range of 99 percent up to theoretical density. The temperature during pressing may vary between 1420 F. to 1770 F. and the pressure should be at least 15,000 p.s.i. Other particulars relating to the production of elements of hot pressed polycrystalline zinc sulfide appear in the Carnall et al. application Serial No. 849,606 filed October 29, 1959, now Patent No. 3,131,025

Hot pressed polycrystalline zinc sulfide elements are excellent infrared optical lenses and, as such, have proven to be a superior material for use in optically immersed photoconductvie cells similar to those described in U.S. Patent 2,964,636, issued December 3, 1960, to Carey. However, hot pressed zinc sulfide elements do not readily accept a metallic coating or film to which reliable solder connections can be made. Attempts to vacuum coat a metal film directly onto hot pressed polycrystalline zinc sulfide produce an inferior coating of metal which is easily stripped from the element by a strip of Scotch tape.

An object, therefore, of the present invention is to provide a hot-pressed polycrystalline zinc sulfide optical element upon which a metal film can be securely coated.

Another object is to provide a hot pressed polycrystalline zinc sulfide element upon which photoconductive detectors can be deposited with improved yield and superior quality.

Other objects will appear hereinafter.

In accordance with a feature of this invention, a layer of zinc sulfide is vacuum evaporated onto an element of hot pressed polycrystalline zinc sulfide. The vacuum-coated sublayer of zinc sulfide provides an excellent surface for the vacuum coating of the metal film. Metals such as gold, silver, copper, iron and nickel can be vacuum coated by conventional means, but gold has been found to be a superior coating metal because of its electrical properties and noble qualities. Coated metal films are useful as partial or complete reflective surfaces as well as electrical current-carrying films. The present invention is useful for any of the conventional purposes for which a metal film coated upon an optical element is desired.

According to another feature of the present invention, the sublayer of zinc sulfide is vacuum coated onto an element of hot pressed polycrystalline zinc sulfide in order to provide a superior surface for the production of optically immersed photoconductive cells. The vacuum-coated sublayer of zinc sulfide provides an excellent surface for vacuum coating of a metal film electrode and a desirable surface for the deposition of photoconductive detectors. Suitable photoconductive detectors are lead salts such as lead sulfide and lead selenide. Whereas thin films of metal will not adhere to hot pressed polycrystalline zinc sulfide, metal films applied in the same manner tenaciously stick to a vacuum-coated sublayer of zinc sulfide. Hot pressed polycrystalline zinc sulfide readily accepts a vacuum-coated sublayer of zinc sulfide and a bond of good strength results between the substrata and sublayer of zinc sulfide.

Since the electrodes of a photoconductive cell cover only a fractional area of the hot pressed polycrystalline zinc sulfide lens, it is necessary to partially mask the hot pressed polycrystalline zinc sulfide lens when vacuum coating the metal film. Improved characteristics are displayed by photoconductive detectors deposited on vacuum-coated sublayers of zinc sulfide so it is advantageous to initially coat the entire area of the hot pressed polycrystalline zinc sulfide lens upon which the photoconductive detector is to be deposited. However, it has been found that the quality of the metal film deteriorates when it is not coated immediately after the sublayer of zinc sulfide is vacuum coated. Therefore, it is necessary that the masking be done expeditiously so that the metal film can be coated onto the fresh vacuum-coated zinc sulfide sublayer.

An alternative approach is to vacuum-coat the desired area of the hot pressed polycrystalline zinc sulfide with a sublayer of zinc sulfide and to thereafter mask it at a convenient time. A second sublayer of vacuum-coated zinc sulfide is then coated on the unmasked area, and the metal film applied immediately after completion of the coating of the sublayer. This latter method results in superior film adhesion, though adequate results have been obtained by the former procedure.

After the electrodes are coated onto the hot pressed polycrystalline element, the photoconductive connector is deposited by conventional chemical procedures. Although photoconductive detectors will deposit directly on hot pressed polycrystalline zinc sulfide elements, improved yields and quality are obtained by using a sublayer of vacuum-coated zinc sulfide.

The invention will be further understood by reference to the following detailed description and drawing in which.

Figure 1:
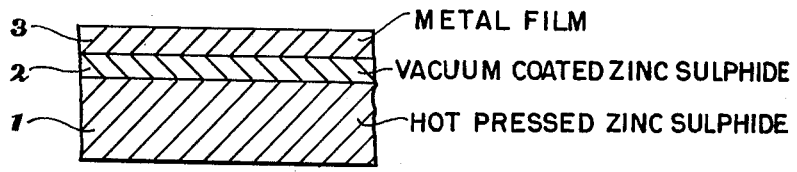
FIG. 1 is a cross-section view illustrating the relative positions of the layers of a hot pressed polycrystalline zinc sulfide element coated with gold by means disclosed.

In FIG. 1 a sublayer 2 of vacuum-coated zinc sulfide is interposed between a hot pressed polycrystalline zinc sulfide element substrata 1 and a gold film 3.

Figure 2:
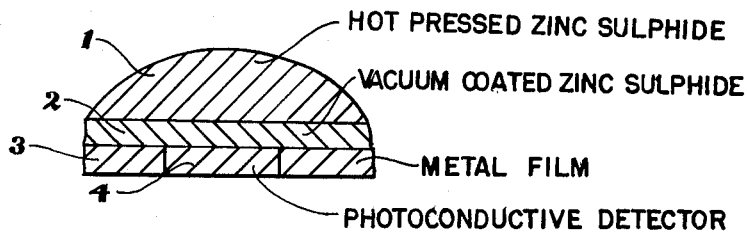
FIG. 2 is a schematic cross-section to illustrate the optical immersion feature of the invention.
Figure 3:
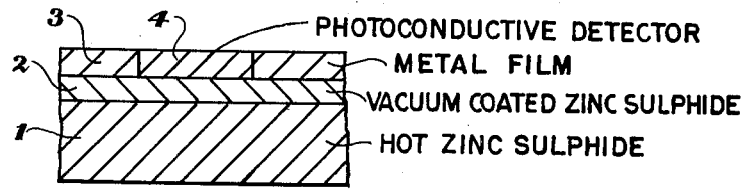
FIG. 3 is a cross-sectional view illustrating an optical immersed photoconductive cell whereon the electrodes are coated immediately upon masking the sublayer of zinc sulfide.
Figure 4:
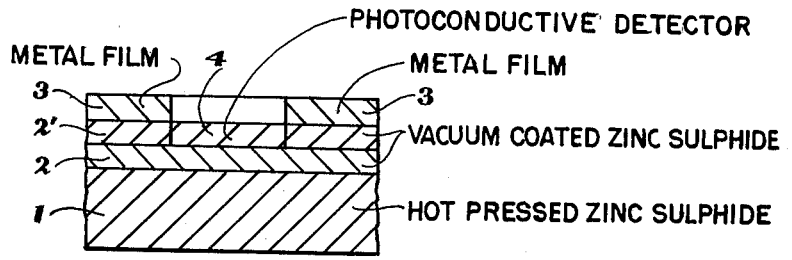
FIG. 4 is a cross-section of an optically immersed photoconductive cell whereon the electrodes are plated after coating a second sublayer of zinc sulfide after masking.

FIG. 2 illustrates an optically immersed photoconductive detector with hot pressed polycrystalline zinc sulfide lens substrata 1 coated with a sublayer 2 of vacuum-coated zinc sulfide and a metal film 3 deposited over a portion of sublayer 2 while a photoconductive detector 4 covers the remaining area. Since it is important that the metal film be vacuum-coated onto sublayer 2 as soon as possible, the metal film 3 may be deposited directly on the initial sublayer 2 as illustrated in FIG. 3 if care is taken to promptly coat the metal film 3, or, preferably a second layer 2' of vacuum-coated zinc sulfide of equal thickness to sublayer 2 may be provided on the initial sublayer 2 and the metal film 3 vacuum coated directly onto the second layer 2' as shown in FIG. 4. In any event, a deposition of photoconductive detector 4 is made over the uncoated sublayer 2.

According to a preferred embodiment of the present invention, the substrata 1 of hot pressed polycrystalline zinc sulfide is ultra-sonically cleaned in a solution of suitable detergent, and then rinses with water. The hot pressed polycrystalline zinc sulfide substrata 1 is then wiped clean and placed in a vacuum coater. A vacuum $5 \times 10^{-5}$ mm. Hg or less is maintained while the hot pressed polycrystalline zinc sulfide is heated to a temperature of approximately 300° C. When temperature and vacuum reach an equilibrium, the heat source is turned off and a high voltage glow discharge is initiated to further clean the substrata 1. Glow cleaning is continued until the temperature of the hot pressed polycrystalline zinc sulfide substrata 1 falls to 120 or 130° C. which should take about 10 or 15 minutes. The glow discharge is then discontinued and sublayer 2 of zinc sulfide is vacuum-coated to an optical thickness of approximately 550 millimicrons as a vacuum is recovered. It is important that the hot pressed polycrystalline zinc sulfide substrata 1 be coated with sublayer 2 of zinc sulfide as soon as possible after the glow discharge is discontinued. If it is desired that only a portion of the hot pressed polycrystalline substrata be coated with metal film 3, the masking can be carried out in the above-described alternative manners.

It is surprising that hot pressed polycrystalline zinc sulfide elements which will not accept metal film coatings can be made to accept excellent metal film coatings by interposing a sublayer of the same material applied by vacuum-coating. This novel composite zinc sulfide composition greatly extends the range of uses for hot pressed polycrystalline zinc sulfide which, in itself, has many unique optical and structural properties.

The invention has been described in detail with particular reference to preferred embodiments thereof, but it will be understood that variations and modifications can be effected within the spirit and scope of the invention as described hereinabove and as defined in the appended claims.

We claim:
1. An article of manufacture comprising a substratum of a hot pressed polycrystalline zinc sulfide element having vacuum-coated thereon a sublayer of zinc sulfide, and a metal film vacuum coated on said sublayer.
2. An article of manufacture as described in claim 1 wherein said metal is gold.
3. An article of manufacture comprising a lens element of hot pressed polycrystalline zinc sulfide, a sublayer of zinc sulfide vacuum-coated onto said element, metal electrodes vacuum-coated onto a portion of said sublayer, and a photoconductive detector layer deposited on, and in optical contact with, the remaining uncoated portion of said sublayer, said photoconductive detector layer consisting essentially of a lead salt selected from the group consisting of lead sulfide and lead selenide.
4. An article of manufacture is described in claim 3 wherein said metal electrodes are gold.

References Cited by the Examiner

UNITED STATES PATENTS 2,808,351   10/57   Colbert et al.   _____ 117—217 X
2,964,636   12/60   Carey   _____ 250—211

RALPH G. NILSON, *Primary Examiner.*

WALTER STOLWEIN, *Examiner.*